April 21, 1953 R. B. WALDER 2,635,325
VERTICAL AUTOMATIC MACHINE TOOL
Filed Jan. 12, 1948 13 Sheets-Sheet 1

INVENTOR.
ROBERT B. WALDER.
BY
Lofebrier, Maltby & Beehler
ATTORNEYS.

April 21, 1953        R. B. WALDER        2,635,325

VERTICAL AUTOMATIC MACHINE TOOL

Filed Jan. 12, 1948        13 Sheets-Sheet 2

INVENTOR.
ROBERT B. WALDER.
BY
ATTORNEYS.

April 21, 1953 R. B. WALDER 2,635,325
VERTICAL AUTOMATIC MACHINE TOOL
Filed Jan. 12, 1948 13 Sheets-Sheet 3
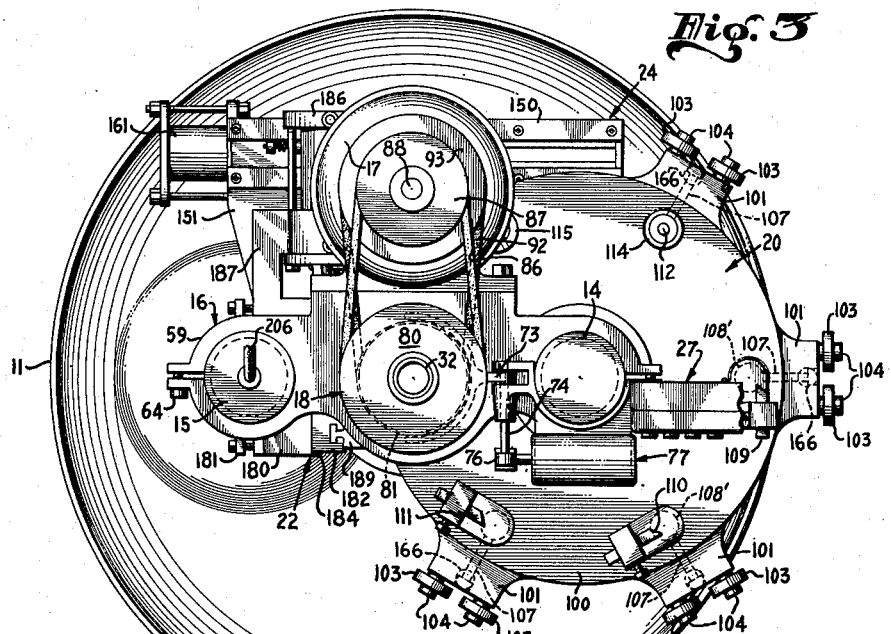
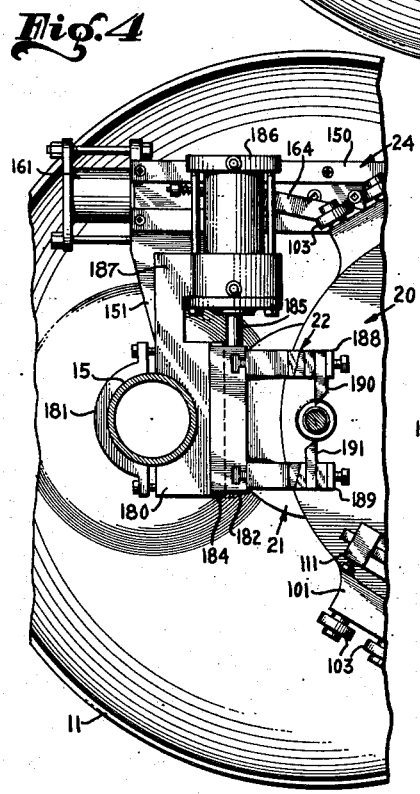
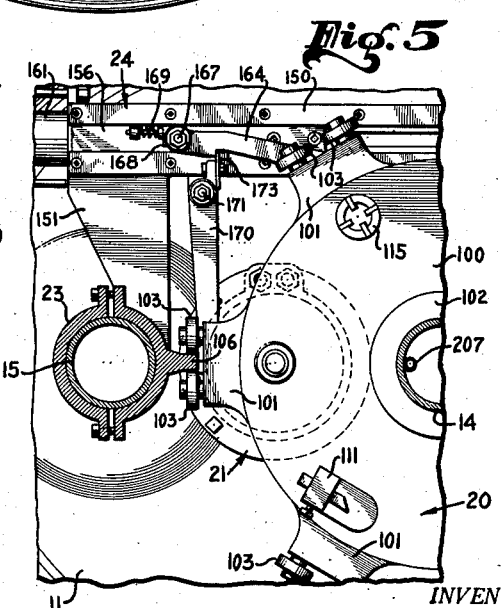
INVENTOR.
ROBERT B. WALDER.
BY
ATTORNEYS.

April 21, 1953 R. B. WALDER 2,635,325
VERTICAL AUTOMATIC MACHINE TOOL
Filed Jan. 12, 1948 13 Sheets-Sheet 4

INVENTOR.
ROBERT B. WALDER.
BY
*Hebner, Malthy & Beehler*
ATTORNEYS.

April 21, 1953   R. B. WALDER   2,635,325
VERTICAL AUTOMATIC MACHINE TOOL
Filed Jan. 12, 1948   13 Sheets—Sheet 5
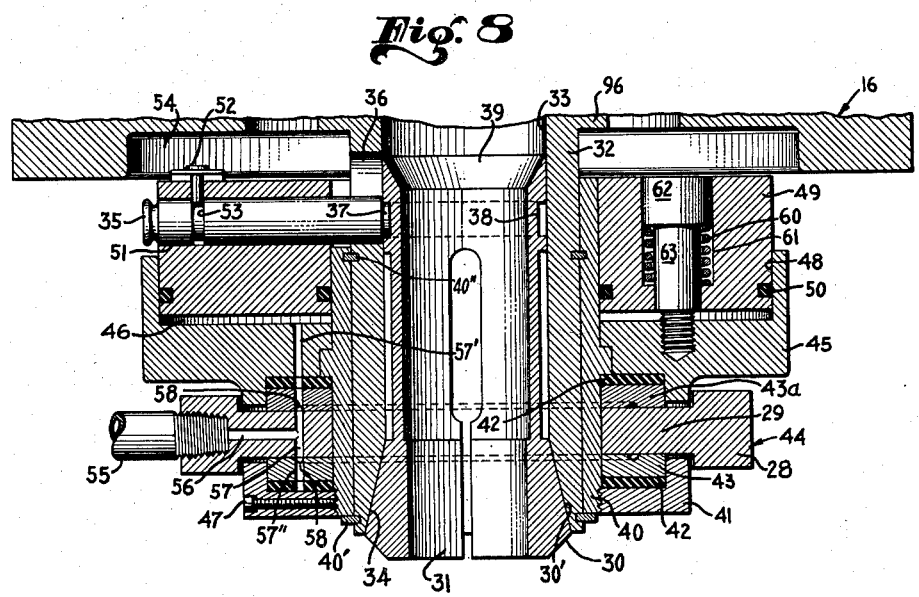
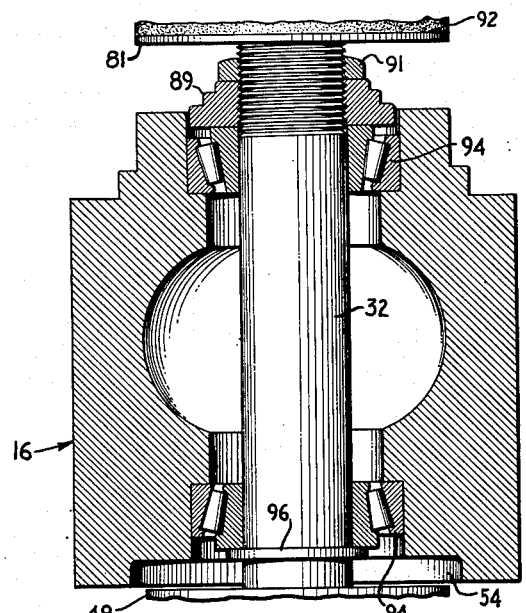
INVENTOR.
ROBERT B. WALDER.

April 21, 1953  R. B. WALDER  2,635,325
VERTICAL AUTOMATIC MACHINE TOOL
Filed Jan. 12, 1948  13 Sheets-Sheet 6

INVENTOR.
ROBERT B. WALDER.
BY
ATTORNEYS.

April 21, 1953  R. B. WALDER  2,635,325
VERTICAL AUTOMATIC MACHINE TOOL
Filed Jan. 12, 1948  13 Sheets-Sheet 7
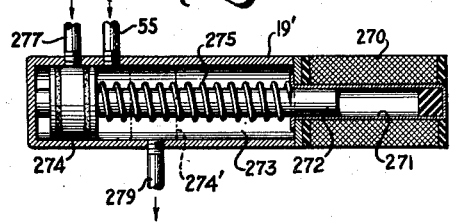
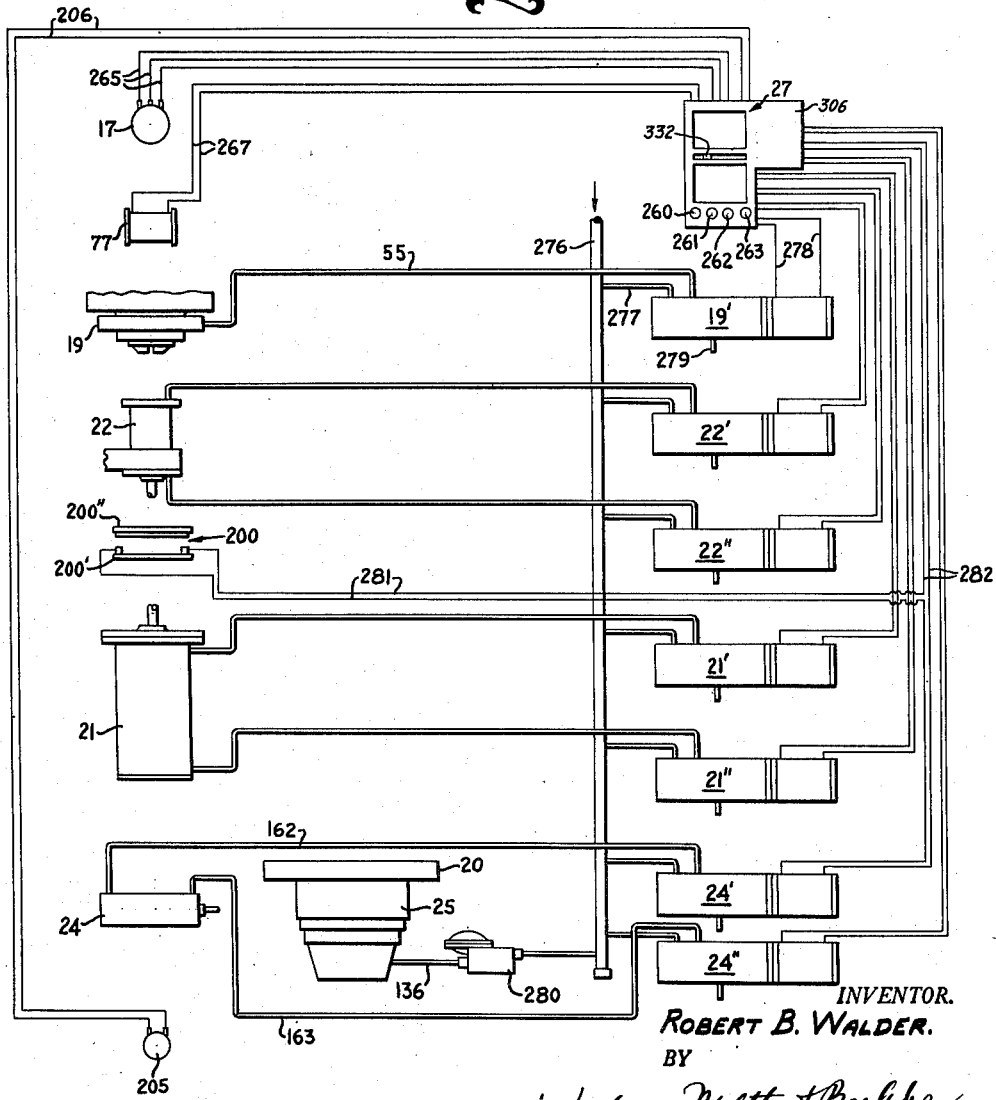
INVENTOR.
ROBERT B. WALDER.
BY
ATTORNEYS.

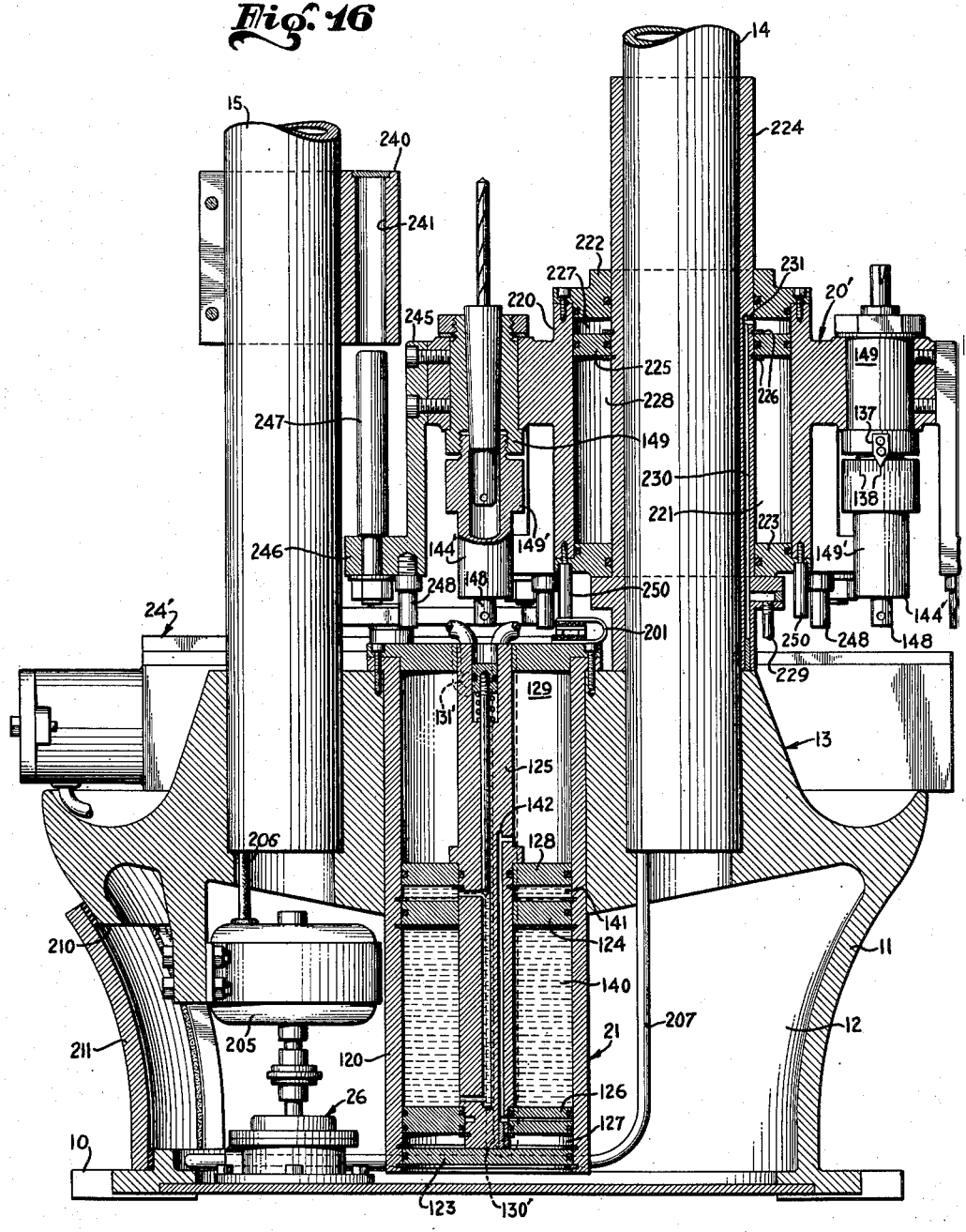

April 21, 1953   R. B. WALDER   2,635,325
VERTICAL AUTOMATIC MACHINE TOOL
Filed Jan. 12, 1948   13 Sheets-Sheet 9
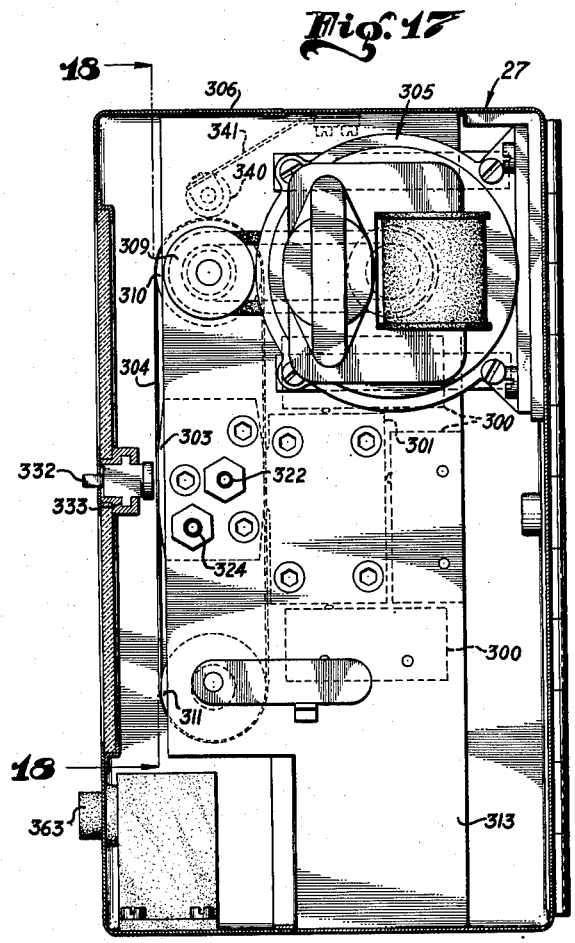
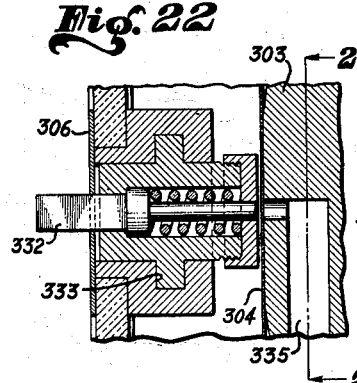
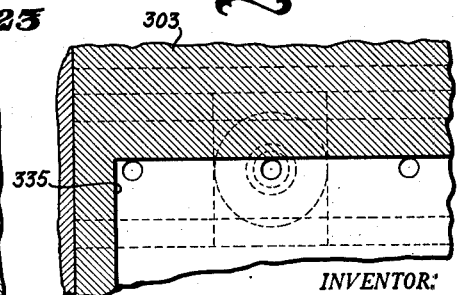
INVENTOR:
ROBERT B. WALDER.
BY
Huebner, Maltby & Beehler
ATTORNEYS.

April 21, 1953   R. B. WALDER   2,635,325
VERTICAL AUTOMATIC MACHINE TOOL
Filed Jan. 12, 1948   13 Sheets-Sheet 10

INVENTOR:
ROBERT B. WALDER.
BY
Huebner, Maltby & Beehler
ATTORNEYS.

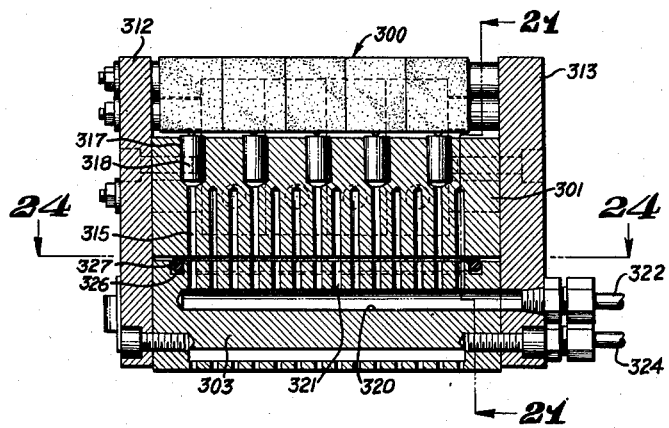
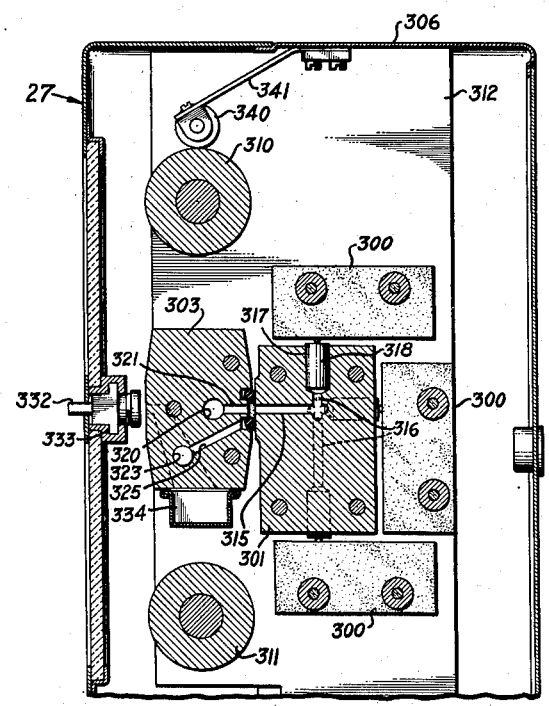
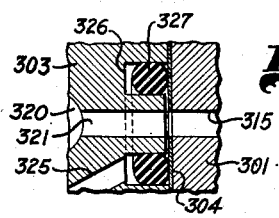

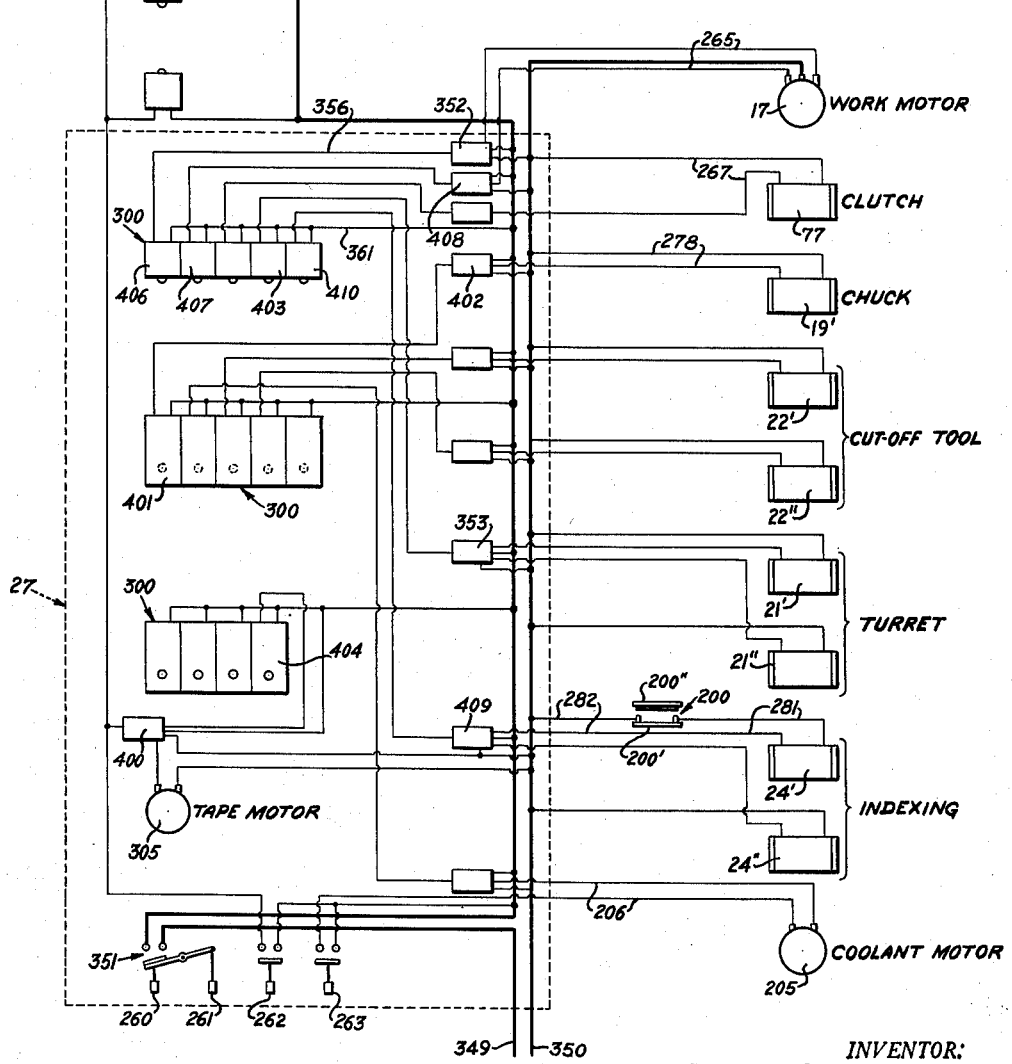

April 21, 1953  R. B. WALDER  2,635,325
VERTICAL AUTOMATIC MACHINE TOOL
Filed Jan. 12, 1948  13 Sheets-Sheet 13
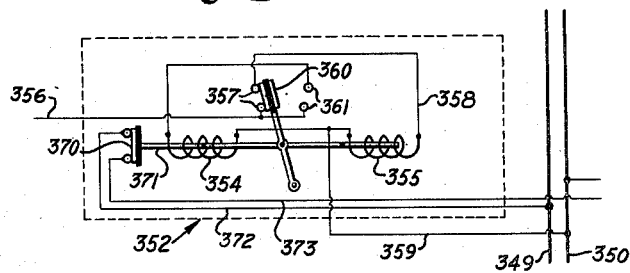
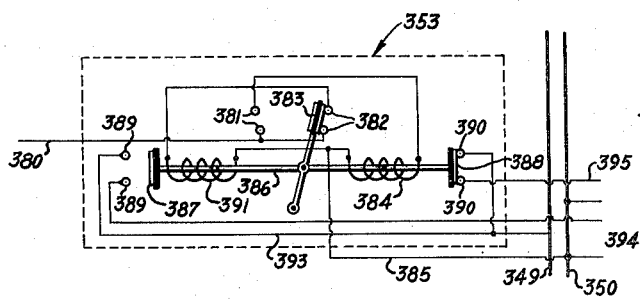
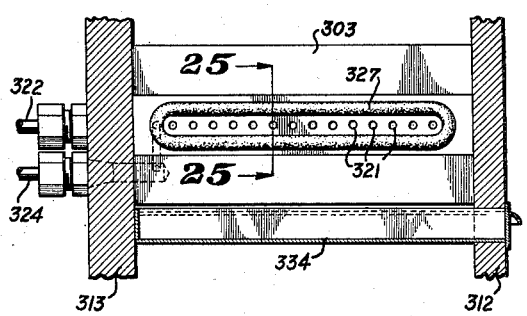
INVENTOR:
ROBERT B. WALDER.
BY
Hebner, Maltby & Beehler
ATTORNEYS.

Patented Apr. 21, 1953

2,635,325

UNITED STATES PATENT OFFICE 2,635,325

VERTICAL AUTOMATIC MACHINE TOOL

Robert B. Walder, Balboa Island, Calif., assignor to Rheem Manufacturing Company, Richmond, Calif., a corporation of California Application January 12, 1948, Serial No. 1,858

24 Claims. (Cl. 29—42)

The invention relates to machine tools and has particular reference to a turret lathe which is positioned with its axis in a vertical direction and in which the feed for bar stock is vertically downward.

Many types of turret lathes have been devised for the purpose of machining bar stock of a great many different sizes, shapes and lengths. By far the great majority of these machine tools are of the horizontal type and for that reason necessitate utilization of a considerable amount of floor space. The great amount of floor space required is not only that occupied by the base of the machine but also necessary space around the machine to permit loading and to permit the operator access to all sides of the machine at any time.

It is, therefore, among the objects of the invention to provide a new and improved automatic turret lathe which is economical in the amount of floor space occupied and in the amount of space needed to give access to all parts of the machine.

Another object of the invention is to provide a new and improved gravity feed automatic turret lathe which is simple in construction, which can be set up quickly and efficiently, and which is sufficiently sensitive so that a high degree of precision can be maintained in the machining operation.

Another object of the invention is to provide a new and improved gravity feed turret lathe wherein each turret position can be independently adjusted to vary its effect upon the work to a fine degree of accuracy without making it necessary in any way to coordinate operations of any successive turret position.

A further object of the invention is to provide a new and improved gravity feed automatic turret lathe which is capable of performing operations on long pieces of bar stock of any selected size for which the machine may be designed and wherein the cut-off is separately operated and adjustable to a degree permitting an exceptionally long cut off.

A still further object of the invention is to provide a new and improved all-automatic gravity feed turret lathe wherein the speed of advance of the tool for each separate turret position can be independently controlled to a high degree of precision without affecting the rapidity of the return to indexing position and wherein the chuck speed can be coordinated independently with each turret operation.

The objects also include a counter-balance for the weight of the turret to improve the smoothness of the machining movements, an efficient lubricating system and a ready means for changing the relative positions of each of the several operating parts of the device located above the base.

Also included among the objects of the invention is the provision of an automatic air-operated chuck, simple in its design, and adapted to be easily coordinated with the operation of the machine after the work hits a spacer on the turret.

With these and other objects in view, the invention consists in the construction, arrangement and combination of the various parts of the device whereby the objects contemplated are attained, as hereinafter more fully set forth, pointed out in the claims, and illustrated in the accompanying drawings, in which:

Figure 3 is a top view.

Figure 4 is a fragmentary, cross-sectional view taken on the line 4—4 of Figure 1.

Figure 5 is a fragmentary, cross-sectional view taken on the line 5—5 of Figure 1.

Figure 8 is a vertical, sectional view of the chuck taken on the line 8—8 of Figure 1.

Figure 9 is a vertical, sectional view taken through the work head on the line 9—9 of Figure 1.

Figure 14 is a longitudinal, sectional view of a typical control valve for the air pressure system.

Figure 15 is a diagram of the air pressure system including the preset control box.

Figure 16 is a vertical, sectional view of the base of the machine tool which incorporates a modified construction.

Figure 17 is a sectional view of the control device taken on line 17—17 of Figure 1.

Figure 20 is a partial section taken on line 20—20 of Figure 18.

Figure 21 is a partial section taken on line 21—21 of Figure 20.

Figure 22 is an enlarged fragmentary detail of an indexing punch.

Figure 23 is a section taken on line 23—23 of Figure 22.

Figure 24 is an enlarged detail section taken on line 24—24 of Figure 20.

Figure 25 is an enlarged detail taken on line 25—25 of Figure 24.

Figure 26 is a schematic electrical diagram of the control circuits.

Figure 27 is an enlarged schematic diagram of a single pole control relay.

Figure 28 is an enlarged schematic diagram of a double pole control relay.

Figure 1:
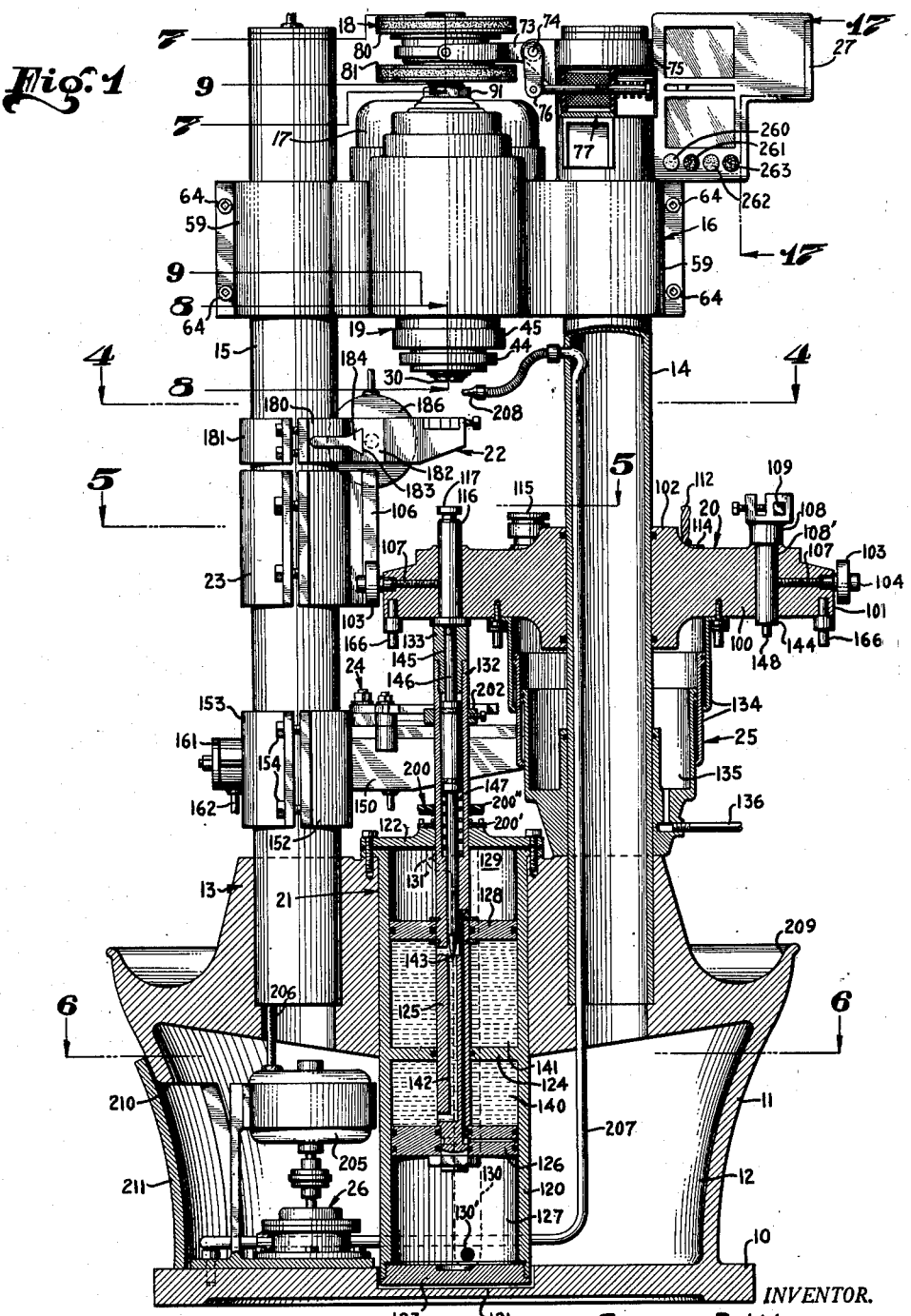
Figure 1 is a front elevational view of the device, partially in section, showing details of the base, the main power cylinder and the turret.

In the selection of a device adapted to embody the invention, certain requisites have been considered important and incorporated into the machine. The over-all dimension of the machine has been kept compact so as to occupy a minimum amount of floor space. The working parts of the machine, because of its vertical construction, extend upwardly where ample space is available. The length of bar stock capable of being handled is limited only by the height of the ceiling. Because of the vertical construction and compact design, an operator or set-up man has easy, quick access to all sides of the machine.

The specific embodiment comprises a base 11 having a floor flange 10, the base providing a hollow interior chamber 12. A top 13 on the base supports ground columns 14 and 15 upon which are mounted most of the working parts of the machine.

For example, the ground columns support a work head or yoke 16 which, in turn, carries a motor 17 adapted to rotate the work through a clutch 18. The work itself is adapted to be retained in a chuck device 19 located on the underside of the work head.

A turret 20 is rotatably mounted upon the ground column 14 and is adapted to be moved axially upwardly and downwardly with respect to the column following rotation of the turret above the column to present different tools to work position. Advance and retraction of the turret is accomplished by means of a main power or work cylinder 21 which is located in the base between the ground columns.

On the ground column 15 there is provided a cut-off device 22 which is vertically adjustable on the column and also an indexing guide member 23 which is also vertically adjustable on the column.

For rotating the turret to its different positions, there is provided an indexing mechanism 24 mounted adjustably upon the ground column 15.

To counterbalance the weight of the turret during its operation, there is also shown in Figure 1 a set of telescoping air-operating cylinders 25. A lubricant pump 26 is located within the chamber 12, and a preset control box 27 is shown mounted upon the ground column 14. The control box is one adapted to automatically control all of the operations of the machine from one point.

Machines of this general construction are adapted to be worked in batteries. For most efficient operation, a battery of machines may be located around and below a loading platform. Preferably, a loading platform will be elevated a considerable distance above the top of the ground columns, the distance depending somewhat upon head room and the length of bar stock being used. An efficient means of operating a battery of such machines consists of loading bar stock of the desired size in quantity upon the elevated platform from which an operator can feed bars one by one into each of the several machines comprising the battery.

Because of the fact that the feed of each machine is downward, the feed can be operated by gravity and special feeding mechanisms dispensed with. This relationship greatly facilitates loading the machine, also, since a single operator need do no more than pass a rod or bar downwardly from the platform into the upper end of the machine in vertical position. Lifting of bar stock is, therefore, minimized and heavy bars can be handled with ease whether in the loading operation or in the subsequent feeding operation in the machine.

The machine herein described contemplates use of motors of a suitable sort for automatically operating the several parts. For the purpose of illustration, air cylinders have been utilized, each being under control of an air valve as illustrated diagrammatically in Figure 15. All of the air valves and other operating parts of the machine are under control from the single preset control box 27 by which any sequence of operations can be established, controlled and changed at will by readjustment or change of the setting of the preset control box.

*The chuck device*

When the machine is ready for operation and reception of a length of bar stock, the chuck device will normally be maintained in a closed position by proper setting of the preset control box. Details of the chuck device are shown in Figure 8. As there illustrated, the means provided for grasping the bar stock consists of a split collet 30 having a central bore 31 of a diameter adapted to fit the maximum diameter of bar stock selected for operation upon by the machine. Obviously, the collet can be readily replaced with collets of a bore of different diameter for the accommodation of bar stock of different sizes, and also of different cross-sectional shape.

The work head 16 has rotatably journaled therein a hollow spindle or driven shaft 32 concentric with respect to the bore of the collet, the spindle being here shown as driven through the clutch 18. The spindle has a bore 33 adapted to receive the collet 30. At the bottom end the bore has an outwardly beveled or flared surface 34 adapted to cooperate with the flared end portion 30' at the lower end of the collet.

For holding the collet in place there is provided a pin 35 which passes through a vertically extending slot 36 in the wall of the spindle and has a reduced end portion 37 adapted to be received in an annular recess 38 in the wall of the collet. The pin 35 is adapted to move upwardly and downwardly in the slot 36 and move the collet upwardly and downwardly with respect to the spindle 32. It will be noted that the upper end of the collet bore 31 has an inwardly sloping portion 39 which is adapted to center a bar or rod within the bore during loading of the chuck.

For operating the chuck and particularly the collet 30 comprising the work-grasping element, there is provided a sleeve 40 surrounded and secured to the exterior of the spindle 32 by snap rings 40' and 40''. It will be understood that sleeve 40 is a split or two-piece sleeve. Such construction is essential to permit assembly. A flanged disc 41 is threadably secured to the lower end of the sleeve and anchored in place by a set screw 47 and provides an annular recess within which is located one of two sealing gaskets 42 and an annular bearing 43 which, in turn, supports an annular compressed air feeder ring 44. The feeder ring has an enlarged circumference 28 and a reduced annular bearing portion 29 against the underside of which rides the bearing 43.

Above the feeder ring is a cap or piston housing 45 having a downwardly directed recess adapted to receive another of the sealing gaskets 42 and a second bearing 43. Construction and operation of these parts is better appreciated when it is understood that the spindle 32, the collet 30, the sleeve 40, disc 41, cap 45 and the bearing 43 are all tied together and operate as a unit.

The cap 45 also defines a cylindrical recess 48 which is adapted to receive an annular piston 49, the piston being provided with a packing ring 50 bearing against the wall of the cylindrical recess 48, these details being shown with particular effect in Figure 8.

The annular piston is provided with a radial bore 51 adapted to receive the pin 35 which can be locked in position by a detent 52 cooperating with an annular recess 53 in the pin. A pocket 54 on the lower side of the work head is adapted to receive the piston when the piston is moved upwardly. It will be apparent from an examination of Figure 8 that the piston can move upwardly and downwardly within the cylindrical recess 48, but that it must rotate with the spindle 32.

It will be apparent that the feeder ring 44 remains stationary and that the bearings 43, the disc 41, cap 45, spindle and attached parts rotate about the feeder ring on the surfaces of the bearings.

To move the piston upwardly there is provided an air pressure line 55 which admits air through a horizontal passage 56 to a vertical passage 57 in the feeder ring. Annular grooves 58 in the bearings communicate with the passage 57, and a passage 57' connects the groove with an annular chamber 46. A passage 57'' terminates at the bottom of the recess in the disc 41.

When air pressure is supplied through the line 55 and passages 56, 57 and 58, pressure is exerted against the lower side of the piston 49 and a reacting pressure is applied against the upper surface of the cap 45, and the upper surface of the ring 41 thereby tending to force the collet 30 into the spindle 32.

When it is desired to release the grasp of the collet upon the work, air pressure is released and the annular piston is moved downwardly by force of springs 60, several of which are located about the annular piston 49 within corresponding recesses 61. The springs bear against the bottoms of the recesses 61 at one end and against heads 62 of studs 63 which, in turn, are threadably secured to the bottom of the recess 48 in the piston housing 45. Obviously, when the grip of the collet upon the work is released, the bar stock will be permitted to pass downwardly by gravity until brought to a stop by means which will be subsequently described. After the bar stock has passed to its new position, the collet may again be operated following the sequence of operations determined by the setting of the preset control box 27.

The work head is provided with split side elements or brackets 59 spanning the respective ground columns and adapted to slide up and down the columns. Bolts 64 are used to tighten the work head in any selected position.

The two-speed clutch

Figure 7:
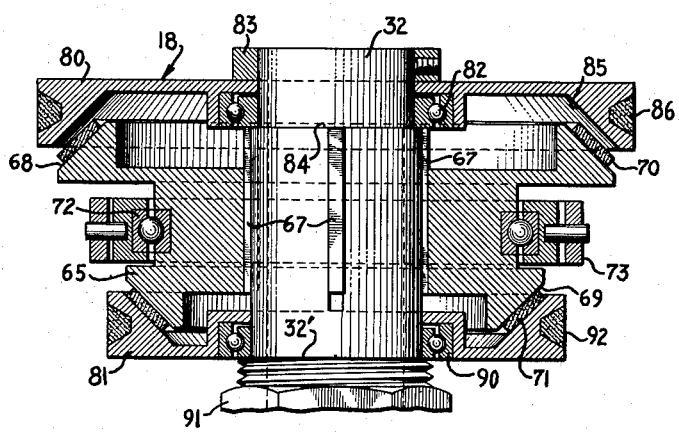
Figure 7 is a vertical, sectional view of the two-speed clutch taken on the line 7—7 of Figure 1.
Figure 10:
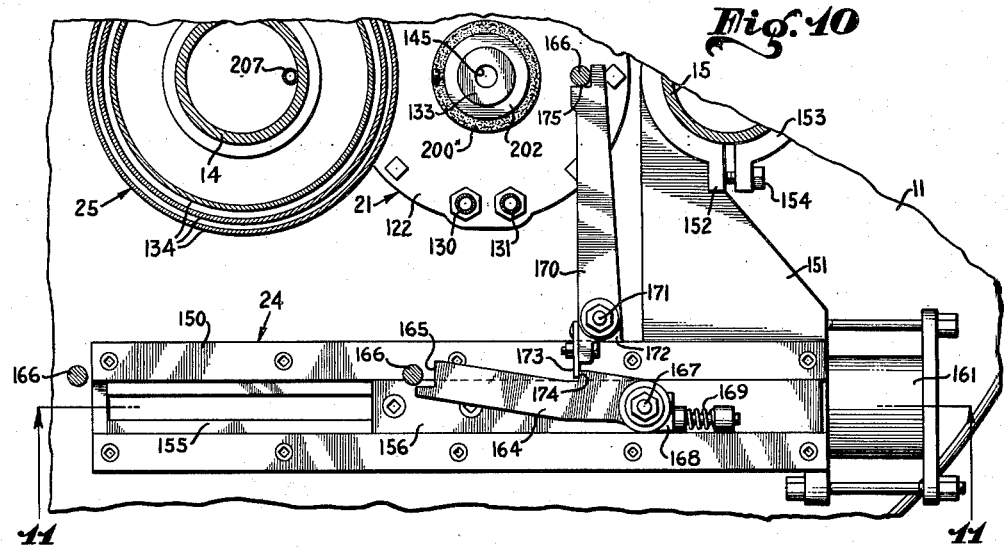
Figure 10 is a fragmentary, plan view of the indexing device.
Figure 11:
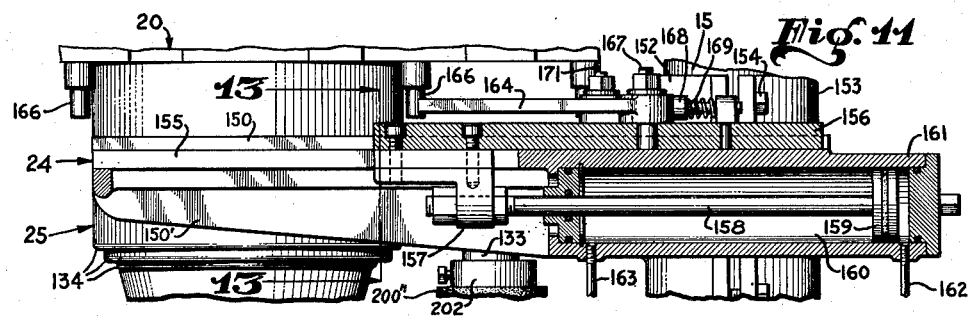
Figure 11 is a vertical, sectional view of the indexing device taken on the line 11—11 of Figure 10.

For rotating the chuck device, there is provided a two-speed clutch, indicated by the reference character 18, which is located above and carried by the work head 16. Details of the clutch are shown in Figure 7. It is contemplated that the two-speed clutch be belt-driven from the motor 17 which can be a four-speed motor, thereby making possible driving the chuck at any one of eight different speeds.

Specifically, the clutch consists of a power take-off disc 65 which is non-rotatably attached to jack shaft or spindle 32 by means of splines 67. The power take-off disc is provided with two separate friction faces comprising one conical face 68 of relatively large diameter and another conical face 69 of relatively small diameter. The friction faces are provided, respectively, with friction rings 70 and 71. The power take-off disc 65 is mounted by means of a ball bearing ring 72 which, in turn, is carried by a yoke 73 pivoted by means of a pin 74 to a support 75 on the ground column 14. A link or arm 76 is fastened to the pin 74 and is the agency by means of which the power take-off disc 65 can be lifted or lowered by action of a solenoid 77. The solenoid is best shown in section at the top of Figure 1 and also appears in the top plan view of Figure 3.

The power take-off disc 65, in turn, is driven either by a larger drive disc 80 or a smaller drive disc 81. The drive disc 80 is rotatably mounted by means of a ball bearing ring 82 upon the spindle 32 where it is retained by a collar 83. The disc is free to rotate about the shaft and is retained against movement in a downward direction by means of a shoulder 84 on the shaft.

The disc has an annular frustro-conical surface 85 adapted to cooperate with the friction ring 70. A belt 86 received in a suitable groove in the disc 80 is connected around an appropriate pulley 87 on a drive shaft 88 of the motor 17.

The disc 81 is similarly rotatably mounted by means of a ball bearing ring 90 upon the driven shaft or spindle 32 and retained in position by a shoulder 32'. A belt 92 received in a suitable recess on the circumference of the disc 81 is driven by means of a pulley 93 likewise mounted upon the drive shaft 88 of the motor.

The driven shaft, also termed a spindle, 32 is mounted by means of bearings 94 in the work head 16 and is connected, as previously described, to the chuck device through the sleeve 40 and piston 49. A nut 89 suspends the shaft 32 upon the upper bearing 94 and further serves to draw a flange 96 on the shaft upwardly against the lower bearing 94 and thus hold the assembly together. A lock nut 91 may be used to fix the location of the nut 89.

So long as the motor 17 is operated one or another of the discs 80 or 81 are used to operate the power take-off disc 65. When faster operation is desired, the power take-off disc will assume the position shown in Figure 7 wherein the pulley 93 of larger diameter on the motor rotates the disc 81 of smaller diameter on the clutch device. When slower operation is desired for the same motor speed, the solenoid 77 may be energized, thereby operating the link or arm 76, the forked element 73, and thereby lifting the power take-off disc 65 to an upper position engaging the disc 80. Under these circumstances, the pulley 87 of smaller diameter on the motor rotates the disc 80 of larger diameter on the clutch device. Different motor speeds will produce different driven speeds on the clutch device.

The turret

Construction of the turret may be best understood from an examination of Figure 1, supplemented by a showing of the turret in plan view in Figure 3. Specifically, the turret consists of a substantially circular work member or disc 100 having radially extending bosses 101 thereon and a hub 102 rotatably surrounding the ground column 14 whereon it is free to both rotate and to shift in a vertical direction through a work cutting range.

The turret shown in Figures 1 and 3 has six stations. As many as six different tools may, therefore, be used in a set-up. Conceivably, however, the turret might on occasions serve as a work or work-holding member and be moved upwardly carrying the work against a tool held by the chuck in the work head.

It will be noted that the outer edge or margin of the turret overlies the center of an axis extending between the center of the chuck and the center of the main cylinder 21 and that a means for holding the tool at each station lies on a circumference which passes directly through this axis.

On each boss 101 are a pair of rollers 103 mounted upon eccentric shafts 104 which provide for a slight lateral adjustment of the rollers. The rollers define a space 105 therebetween which is adapted to accommodate a guide or track 106 comprising part of the indexing guide member 23, the guide being stationarily secured upon the ground column 15.

A set screw 107 is provided for each station adapted to secure a column or shank 108' of a tool-holder 108. Different tools 109, 110, 111, 112, 115, etc., may be provided for each of the stations. The tool 112, for example, is illustrated as constituting a drill retained in a tool-holder 114. At one station, there should preferably be provided, instead of a tool, a bar stop 117 preferably provided with an air dash pot 116. It will be understood that should precise adjustments be necessary, a micrometer setting of a somewhat conventional sort may be incorporated in the bar stop. The station bearing the bar stop is illustrated as occupying a position beneath the collet.

When bar stock is passed through the collet before being grasped thereby, it is free to drop until the bar is stopped against the bar stop, thereby fixing the location of the bar at which it is to be grasped by the collet. For a different adjustment, the bar stop may be lifted or lowered and thereafter tightened in place by the adjacent screw 107.

The main cylinder

Figure 2:
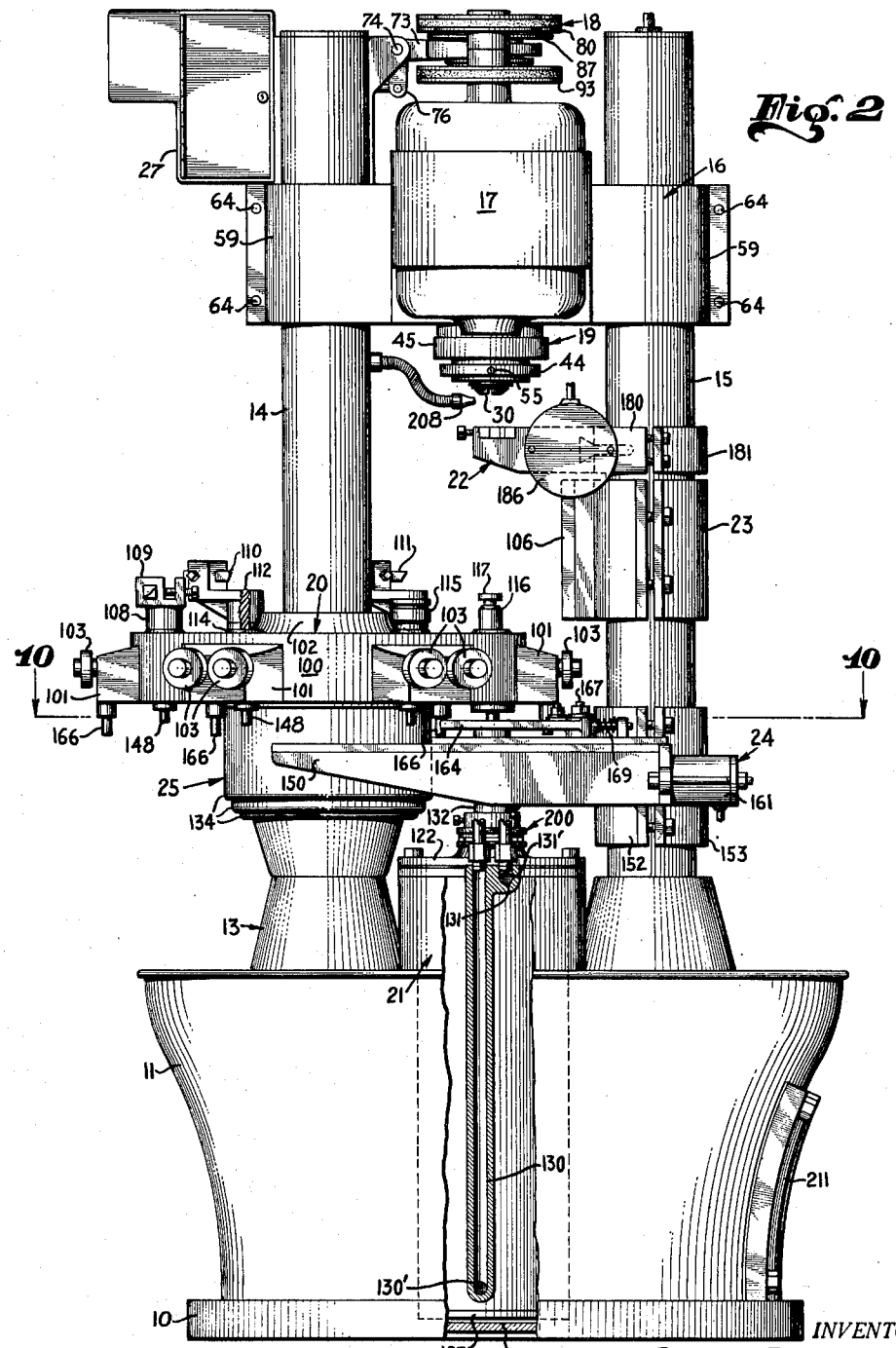
Figure 2 is a rear elevational view showing feed lines for the main cylinder in section.
Figure 6:
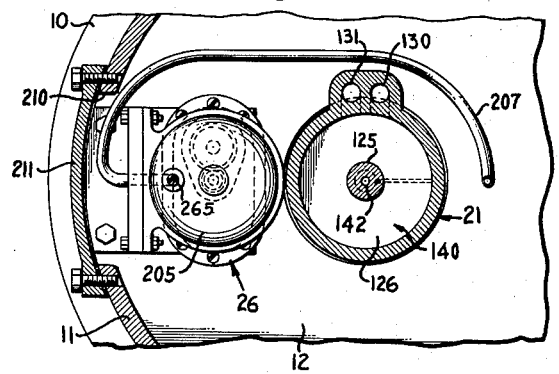
Figure 6 is a fragmentary, cross-sectional view taken on the line 6—6 of Figure 1.

The main cylinder 21 is shown in vertical section in Figure 1 and also appears in Figures 2 and 6. In the drawing the main cylinder comprises a cylindrical casing 120 defining a hydraulic chamber which extends through the top 13 and is supported in a recess 121 in the bottom of the base 11. The cylinder has a cap 122 sealed at the top and a bottom 123.

Within the cylinder at approximately the mid-point is a partition 124 dividing the cylinder into a lower portion 127 and an upper portion 129. In the partition is a central aperture adapted to accommodate a piston rod 125. At the lower end of the piston rod is a piston device comprising a piston or disc 126 slidably mounted within the lower chamber portion 127. A second piston or disc 128 is slidably mounted within the upper chamber portion 129.

Air pressure is utilized to operate the main cylinder, there being provided an air inlet line 130 terminating in an inlet port 130' at the bottom of the lower portion 127 of the chamber and an air inlet line 131 terminating in an air inlet port 131' at the top of the upper chamber portion 129. Air admitted through the port 130' will lift the pistons and piston rod 125 through progressively extended positions, air being exhausted at the same time from the upper chamber portion through the port 131'. In a downward or reverse direction, air is exhausted from the port 130' and may, if advisable, be admitted under pressure through the port 131'.

The piston rod 125 has an upper extension 132 at the top of which is a head or plug 133 designed to exert its force at the bottom side of the turret 100 by pressure against the columns or shanks 108'. By this means the main cylinder is adapted to force the turret upwardly into machining positions. Projections or gages 144 at the bottoms of the columns determine the extent of movement. The greater the length of the projection, for example, the further upward the turret will be moved at completion of the stroke of the piston rod 125.

To counterbalance the force of the main cylinder, carried upward by action of the piston rod and the extension 132, near the edge of the turret there is provided a counterbalance which, as shown in Figure 1, constitutes a set of telescoping cylindrical elements 134 enclosing an extensible air chamber 135 of variable capacity which is adapted to communicate through an air pressure pipe 136 to the air pressure supply.

The pressure of air passing through the pipe 136 may be controlled so that the pressure is sufficient to support about 80% of the weight of the turret, more or less depending upon how much weight must be supported in order to maintain smooth operating conditions.

Control of the direction of air pressure to the ports 130' and 131' determines the direction of movement of the main cylinder. In addition to the control of direction of movement of the main cylinder, the speed of movement may also be controlled. This is accomplished by control of the flow of a body of hydraulic fluid imprisoned between the pistons 126 and 128.

The piston 126 defines a hydraulic chamber 140 between itself and the partition 124. The piston 128 defines a hydraulic chamber 141. These chambers are interconnecting by means of a passage 142 through the lower portion of the piston rod 125. Flow of hydraulic fluid through the passage 142 may be controlled by a needle valve 143. To position the needle valve, the tool-holder 108 is provided with a downwardly directed center extension 148 on a projection or gage 144 which is adapted to enter a bore 145 in the head 133 wherein an extension 146 of the needle valve is located. The needle valve is held in "up" position by means of a spring 147 so that it is normally adjusted to full "open" position.

When the main cylinder is operated under air pressure, it moves upwardly at a maximum rate of speed. As soon, however, as the extension 148 strikes the extension 146 of the needle valve, the needle valve will be moved against the pressure of the spring 147 downwardly so that the needle valve 143 partially closes the passage 142. This partial closure of the passage restricts the freedom of flow of hydraulic fluid from the hydraulic chamber 140 to the hydraulic chamber 141 and is thereby used to control the rate of tool advance.

A modified type of projection or gage 144' is shown in detail in Figure 16. This modified type is suited also for application to the form of Figure 1. Upper and lower blocks 149, 149', respectively, have a threaded connection by means of which the lower block can be extended or retracted and in this way change the effective length of the projection. This, in turn, controls the extent of movement upwardly of the turret for a given travel of the piston rod 125. A pointer 137 and calibrated scale 138 serve to indicate the setting of the adjustable blocks. The length of a center extension 148' which may, if desired, be similarly adjustable, is adapted to control the speed of travel of the piston rod through the needle valve previously described. The speed may by this means be adjusted individually for each station of the turret. The speed frequently needs to be varied in accordance with the type of cut made upon the work by the particular tool installed at any one of the several stations, as well as the kind of metal comprising the work.

When the piston rod is lowered, the needle valve will be returned to full open position by spring 147 and lowering of the main cylinder, and the turret will proceed at a maximum rate of speed.

It will be appreciated, of course, that preferably all of the columns or shanks may be provided with a micrometer stop identified in part by the threaded blocks 149, 149' operating adjacent the bottom side of the turret, and that by adjustment of a micrometer stop movement of the turret and the tool upwardly may be adjusted to any desired setting.

Indexing

For rotating the turret from station to station to the various positions wherein a tool can be operated on the work, an indexing mechanism is provided, indicated generally by the reference character 24, and illustrated in considerable detail in Figures 10, 11, 12 and 13. The indexing mechanism is carried by a platform 150 which includes angle strips 150'. By means of the angle strips, the platform is supported by a bracket 151, which is attached to the ground column 15 by clamps 152 and 153 bolted in position by bolts 154. Spaced opposite sides of the platform 150 provide a guideway 155 for a slide or sliding block 156 at the bottom of which is a bracket 157 attached to a piston rod 158. The piston rod has attached at one end a piston 159 slidably received within a chamber 160 of a casing 161. The chamber 160 is provided with air pressure lines 162 and 163 at its respectively opposite ends. Air under pressure may be introduced thereby to one side or the other of the piston 159, causing it to reciprocate.

Mounted upon the slide 156 is a latch finger 164 having a shoulder 165 adapted to engage successively downwardly depending lugs or pins 166 on the turret. The latch finger is pivotally mounted upon a pin 167 and is provided with an abutment 168 on the side of the pin 167 remote from the end 165. A compression spring 169 pressing against the abutment tends always to urge the latch finger into potentially engaging position with the lugs 166 but permits movement of the latch finger 164 when it is being retracted past one of the lugs 166.

Figure 12:
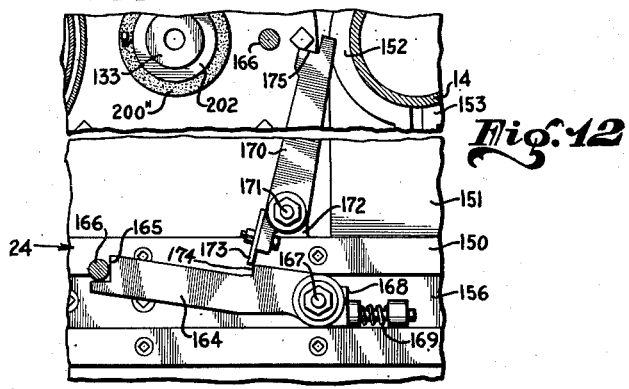
Figure 12 is a plan view of the indexing device similar to Figure 10 but with the parts in a different position.
Figure 13:
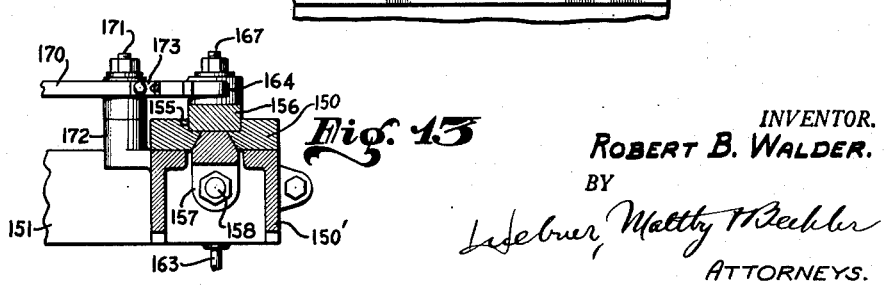
Figure 13 is a cross-sectional view of the indexing device taken on the line 13—13 of Figure 11.

A second latch finger 170 is pivotally mounted upon a pin 171 secured to a bracket 172 on the platform 150. An extension 173 on the latch finger 170 projects into engagement with a shoulder 174 on the adjacent side of the latch finger 164. The latch finger 170 is also provided with a shoulder 175 at the end, which is adapted to engage any one of the lugs 166. The function of the latch finger 170 is that of a locking device to restrain movement of the turret once it has been advanced to a new position. The latch finger 170, however, is disengaged whenever an indexing movement is to be accomplished by pressure of the shoulder 174 against the extension 173 upon movement of the latch finger 164 from left to right as shown in Figure 12.

The cut-off device

The cut-off device 22 is adapted to be adjustably secured to the ground column 15 by means of brackets 180 and 181 so that it can be raised or lowered to any position desired. The cut-off device includes a slide 182 which is provided with a recess 183 adapted to receive a track 184 on the bracket 180, as is illustrated in Figures 1, 2 and 4.

The slide is shown secured to a piston rod 185 which is reciprocated by means of a dual action air-actuated cylinder or ram 186, the ram, in turn, being attached by an extension 187 to the bracket 180. Upon the slide are adjustably mounted elements 188 and 189 which, in turn, carry cut-off knives 190 and 191, respectively. The knives 190 and 191 may be used for either a clean cut-off or for chamfering the work during a final operation. Operation of the cut-off knives is accomplished by means of the air-actuated ram 186 which is controlled, as are the other operating elements of the device, from the preset control box.

So that the turret cannot be advanced by the indexing means while it is being lifted, there is provided a safety switch 200, the location of the safety switch being illustrated in Figure 1, and a corresponding safety switch 201 being shown in Figure 16. Figure 1 shows the switch consisting of a lower fixed member 200' and an upper movable member 200" spring urged to open position. A collar 202 is adjustably secured to the piston rod and is adapted to close the switch when the piston rod moves to a lowered position.

Lubrication is provided by means of the lubricant pump 26 shown at the bottom of the chamber 12, which is operated by means of an electric motor 205 having a power connection 206 which extends through the ground column 15. From the pump 26, a lubricant line 207 extends upwardly through the ground column 14 to a nozzle 208 adjacent the collet. Lubricant falls upon the working parts of the machine and is eventually deflected into a trough 209 from which it drains through suitably screened apertures, not shown, into the chamber 12 from which it can be recirculated by means of the pump. An inspection aperture 210 is closed by means of an inspection plate 211, removal of which gives access to the chamber 12.

In a modified construction shown in Figure 16, a different type of counterbalance is provided for a turret 20'. In this instance, the turret is provided with a hub 220 formed with a central chamber 221 which serves the purpose of an air chamber having an upper head or end plate 222 and a lower head or end plate 223, each head having a frictionally slidable sealing relationship with a sleeve or jacket 224 on the ground column 14. Within the air chamber is an annular piston 225 which is attached securely to the jacket 224 by suitable snap rings 226. The annular piston divides the air chamber into an upper portion 227 and a lower portion 228 variable as to size with movement of the chamber wall with respect to the piston 225.

Air under pressure is supplied through a compressed air line 229 and makes its way through a bore 230 in the jacket 224 to an inlet port 231 into the upper portion 227. A suitable exhaust port, not shown, may be provided for the lower portion 228 of the chamber. The device just described is designed to take the place of the telescoping counterbalance 25 previously described in connection with Figure 1.

This modification also incorporates an indexing guide of construction slightly different from that described in connection with Figure 1. In this instance the indexing guide comprises a block 240 adjustably mounted upon the ground column 15, the block having extending therethrough a vertical passage 241.

On the turret 20' at each station is a bracket 245 which extends downwardly and is provided with a shelf 246 at the lower end. A stud 247 is bolted upon the shelf and extends upwardly in precise alignment with the passage 241 when any given station is indexed to work position. When the turret is lifted by means of the main cylinder 21, the stud 247 enters the passage 241 sliding within it during the working stroke, thereby centering the tool at any particular station with respect to the work.

Also in this embodiment the shelf 246 has mounted thereon indexing studs 248 which are manipulated in the same manner as the indexing lugs 166 previously described. Safety studs 250 are provided for tripping or closing the safety switch 201 when the turret is in its lowered position.

Because of the fact that the turret 20' lowers to a position adjacent the top 13 of the base, an indexing mechanism 24' may be located upon the top rather than upon the ground column 15, a position in which it will always be capable of cooperation with the indexing studs 248.

*Diagram of operation*

An understanding of the description of the operation of the device can be had from the diagram of Figure 15. In the diagram the preset control box 27 is illustrated with electric connections extending from the control box to solenoid-operated hydraulic valves. Other electric connections extend from the present control box directly to electro-responsive devices on the machine.

A start button 260, a stop button 261, a tape motor switch button 262 and a coolant switch button 263 are provided on the preset control box. All operations of the machine are controlled through the preset control box.

From the preset control box a set of leads 265 extend to the main motor 17, and the four speeds of the motor can be controlled and changed by operation of the preset control box. Leads 266 to the motor 205, as well as leads 267 to the two-speed clutch solenoid 77, likewise emanate from the preset control box.

Other leads from the preset control box extend to one or another of the solenoid-operated air valves which control operation of the different mechanisms of the machine tool comprising the subject matter of the invention. A description of one of the valves will suffice for all, a longitudinal section of which is shown in Figure 14.

It may be assumed that the solenoid-operated valve thereshown is a valve 19' which is adapted to control opening and closing of the chuck 19. The valve includes a solenoid 270 within which is a bore 271 adapted to receive an armature 272. The solenoid-operated valve comprises an air chamber 273 within which is slidably positioned a piston 274 attached to the armature 272. A spring 275 is provided to return the plunger to the normal position shown in Figure 14.

Normally, air under pressure in an air pressure line 276 is conducted through an air feed line 277 to the air chamber 273. In normal position the piston 274 will block admission of air.

When the solenoid 270 is energized through electric leads 278, the plunger 272 is moved from left to right as is also the piston 274 until the piston occupies the dotted line position 274' shown in Figure 14. Movement of the piston as thus described opens the air pressure supply line 277 into the chamber 273 and also opens the air line 55. Air under pressure is thus communicated to the air-operated chuck illustrated in Figure 8.

When the chuck is to be released, the solenoid 270 is de-energized, and the piston 274 returns to its initial (solid line) position of Figure 14. In this position of the valve, air from the chuck may be exhausted through the air line 55 into the air chamber 273 and thence to an exhaust line 279. It will be apparent that the weight of the spring 275 must be greater than the pressure of air in line 277.

The other air valves operate similarly except that, for example, in the case of the cut-off, the main cylinder and the indexing mechanism, an air valve is provided for passing air under pressure to both sides of the particular air cylinder involved. In this way the cylinder can be moved under power in either direction. Each and every one of the air valves is under control of the preset control box.

The counterbalance 25 includes a constant pressure regulator 280 in the air line 136 which leads to the air pressure main 276. By proper setting of the pressure regulator, the same amount of counterbalance is maintained for the turret at all times.

The safety switch 200, previously described as being operated by movement of the piston rod 125, is connected in series with the indexing mechanism as exemplified by the leads 281 which join one of the leads 282 between the preset control box and a solenoid-operated air valve 24'. It will be apparent that unless the safety switch is in closed position there can be no completion of the circuit through the solenoid of the air valve 24' in order to advance the indexing mechanism. Reversal of the indexing mechanism is accomplished by means of the air valve 24". The same description of operation applies in general to the safety switch 201 in the modified form illustrated in Figure 16.

Similarly, the cut-off is controlled by solenoid-operated valves 22' and 22", and the main cylinder 21 is controlled by solenoid-operated air valves 21' and 21".

*Indexing and control mechanism*

The control mechanism heretofore designated and referred to by the number 27 is shown in detail in Figures 17-24, inclusive. It comprises essentially a plurality of microswitches 300 grouped about a cylinder block 301 and actuated by means of pneumatic pistons 318.

Compressed air for controlling the pneumatic pistons is introduced into the cylinder block by means of a manifold block 303 and controlled by what might be termed "a valve belt" 304.

Figure 18:
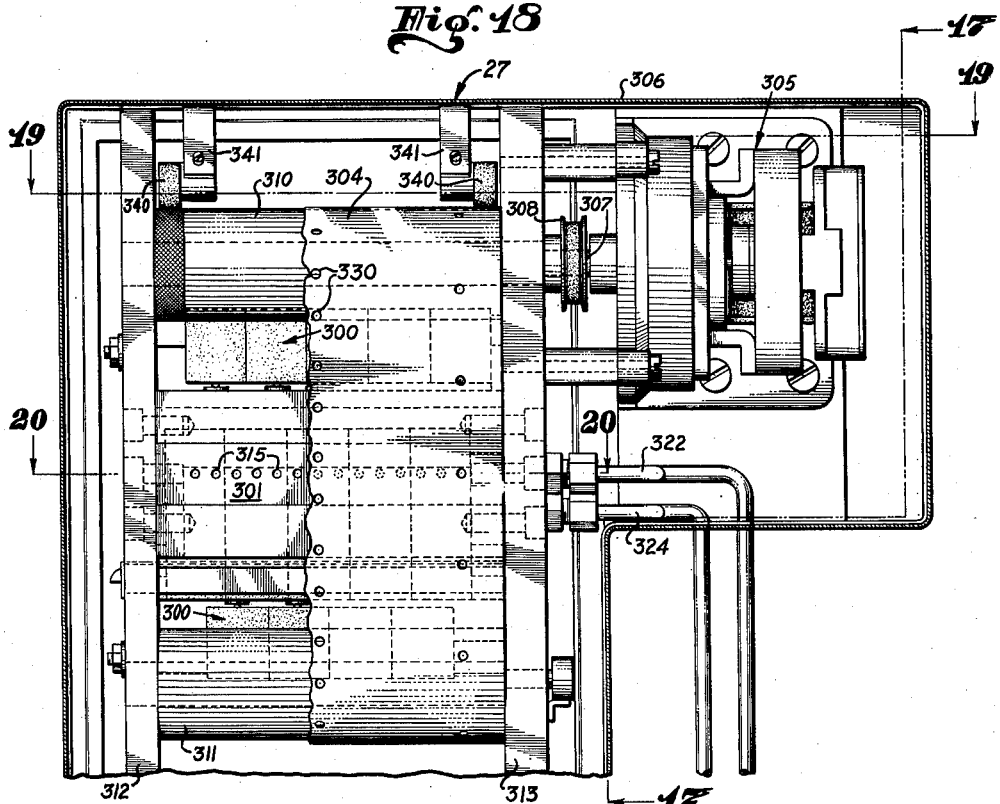
Figure 18 is a sectional view taken on line 18—18 of Figure 17.
Figure 19:
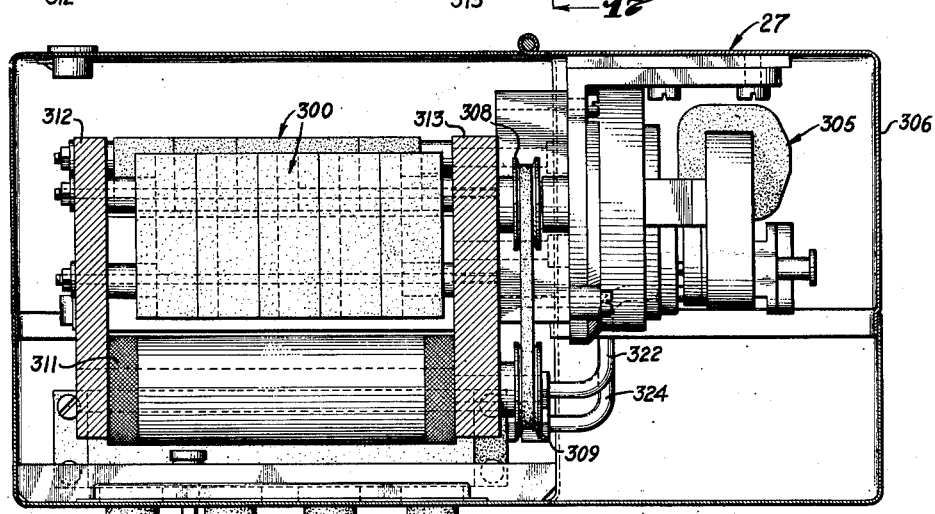
Figure 19 is a sectional view taken on line 19—19 of Figure 18.

As will be seen more clearly in Figures 17-19, inclusive, the control box is provided with a motor, designated generally 305, mounted in a housing 306 and adapted by means of a shaft 307 and pulleys 308 and 309 to drive a pair of rollers or drums 310 and 311. The drums 310 and 311 are rotatably mounted in end plates 312 and 313.

The end plates 312 and 313 are secured inside the housing 306 by any suitable manner and also mount the piston block 303, as will be seen more clearly in Figure 21. The cylinder block comprises a rectangular-shaped block having a plurality of inlet bores 316. The outer end of the outlet bore 316 is enlarged to form a cylinder 317 which is adapted to receive a piston 318.

It will be noted in Figure 21 that the microswitches 300 are positioned on three sides of the cylinder block 302. Each of the inlet bores 315 communicates with an outlet bore 316 which alternately extends or communicates with each of the three sides adjacent the microswitches 300. This will be more clearly apparent from Figure 20, wherein it will be seen that commencing on the left-hand side, bores Nos. 1, 4, 7, 10 and 13 communicate straight through to the pistons 318 at the top of the block; bores 3, 6, 9 and 12 communicate with the pistons at the back of said figure; and bores 2, 5, 8 and 11 communicate with the pistons to the front of the block, which have been cut away by reason of the sectional view.

The manifold block is formed with a longitudinal passage 320 and a plurality of outlet ports 321 adapted to register with the inlet passages 315 of the cylinder block. Compressed air is supplied to the passage 320 by means of an air line 322.

A cylinder block 303 is also formed with a longitudinal bore 323 which communicates with a source of compressed air by means of a conduit 324. The bore 323 communicates with the passageway 325 which is adapted to carry said pressure from the line 324 into a peripheral groove 326 surrounding the discharge ports 321 in the cylinder head 303. An O-ring gasket 327 is disposed in said peripheral groove 326 to act as a seal, as will be more clearly explained later.

It will be apparent that whenever compressed air is supplied through the line 322 into the bore 329 and ultimately applied to the pistons 318, the pistons 318 will be urged downwardly against the microswitches 300, thereby making contact through said switch unless the control means for interrupting said pressure is employed. Such means is found in the valve tape 304. The valve tape 304 comprises an endless belt of flexible material through which a plurality of holes 330 have been punched. It will be readily apparent that the position both laterally and transversely of the holes 330 and the rate of travel of the valve tape 304 past the inlet bore 315 will determine the sequence of energizing the various equipments connected with the microswitches 300.

A means for indexing the valve tape in order to control the sequence of operation of a particular set-up or job is supplied in the form of a punch, the details of which are shown clearly in Figures 22 and 23. As the valve tape 304 is moved past the manifold block 303, holes can be punched through the tape by means of a punch 332, which is horizontally slidable in a track 333 across the face of the housing 306. The punch acting upon the tape 304 punches holes in the desired position, the punchings being collected in a removable collector 334 secured to the bottom of the manifold block 332 through a slot 335.

A pair of idling wheels 340 resiliently mounted on the frame 306 by means of a resilient arm 341 are adapted to ride against the tape 304, thereby maintaining a sufficient friction between the tape 304 and the driving drum 310 to insure that no slippage occurs.

As will become clear from subsequent explanation of the mode of operation of the control system, the sequence of operations is controlled by the rate of travel of the valve tape 304, which determines the periods when air is applied to the bores 315 for actuation of the pistons 318 and connecting switches 300. As each individual hole 330 passes or dwells in registry with the respective bores 315, corresponding switches 300 will complete the circuit.

In Figure 26 I have schematically illustrated an electrical wiring diagram showing one manner in which the control system can be connected for control of the various functions of my automatic vertical lathe. In Figure 26, solenoids are represented schematically and assume the same numbers as shown in Figure 15, which is a schematic representation of the pneumatic lines embodied in my invention. Other numerals appearing in Figure 26, which are similar to numerals in other drawings, represent similar elements.

The circuit comprises a source of power 349 and 350, one side of which is common to all solenoids, the other side of which is controlled by a master switch 351. Closing the master switch 351 will complete the circuit to the microswitches 300. A plurality of these microswitches 300 are provided and are connected to double or single pole magnetic relays 352 and 353. The magnetic relay 353 is a single pole relay, as is illustrated in detail in Figure 27. It comprises a double-throw switch, which is magnetically operated by solenoids 354 and 355. In the position shown in Figure 27, a complete circuit exists between the lines 356, switch points 357, line 358, solenoid 355 and line 359. The line 359 is connected to a common side of the power source 350. Therefore, it will be seen that if the circuit is completed between the line 356 and the line 349 of the source of power, solenoid coil 355 will be energized thereby pulling the switch blade 360 to the right, breaking that circuit and establishing a circuit which follows the line 356, switch points 361, solenoid coil 354, line 359 and source of power 350.

The line 356 is connected to one of the microswitches which will form a complete circuit through the line 361 to the power source 349 when air is admitted into the appropriate bore 315 by reason of the registry of an appropriate hole in the valve tape 304. As will be understood, while the valve tape 304 is moving, the completed circuit through the microswitch 300 will be momentary and will be interrupted before the second circuit established above can be completed, so that the switch point 360 will remain against the contacts 361.

A contact point 370 is disposed on the end of an armature 371 which is controlled by the solenoids 354 or 355. The contact point 370 is adapted to complete a circuit between the lines 372 and 373. The line 372 connects with the source of power 349 and with the solenoid or implement to be operated at the particular sequence in the operation. It will, therefore, be seen that when the proper punch on the tape 304 registers with the bore 315, which permits compressed air to operate the microswitch 300, the specific valve or piece of equipment corresponding with that particular setting will be energized or de-energized as the case may be.

In some instances, it is necessary to use what might be termed "a double-pole, double-throw magnetic switch." Such a switch is illustrated in Figure 28. It comprises a control circuit having a supply line 380 connected in parallel between a pair of switch points 381 and 382. The switch points 381, when connected by means of the breaker point 383, energize a magnetic coil 384 which is provided with a return to the source of power 350 by means of a line 385.

An armature 386 carries a pair of breaker points 387 and 388 on opposite ends thereof adapted to complete the circuit across the switch points 389 or 390. When the breaker point 383 is connected across the switch point 382, magnetic coil 391 is energized, thereby pulling the armature 386 to the left, breaking the circuit across the switch point 390, and making contact across the switch point 389.

A line 393 is connected to the source of power 349 and is common to both switches 389 and 390. Switch returns 394 from the switches 389 and 395 from the switch 388 are connected with a pair of solenoid valves, such as that illustrated in Figure 14, adapted to advance or retract a given function of the machine. Thus, it will be seen that impulses of electricity flowing through the double switch 353 alternately energize one of two solenoid valves. Whereas, impulses of electricity running through the solenoid switch 352 alternately energize or de-energize a given solenoid valve.

In the operation of the control mechanism 27, a sheet or endless belt 304 is wound around the drums 310 and 311 and indexed to fit the particular job set-up, being used in the lathe by punching holes 330 in the tape 304 at the proper intervals so that the proper function will commence at the proper time. After the tape has been properly punched or indexed and the machine made ready for operation, switch 351 is closed by pushing the start button 260 and a tape start button 262. By closing the tape start button 262, the circuit is completed from the main line 349 through the switch 351, through the switch 362, to the starter solenoid switch 400. The starter solenoid switch completes the circuit through the tape motor. The rotation of the tape motor moves the tape so that a hole 330 in said tape registers with the proper microswitch. For example, in this diagram, microswitch 401 energizes solenoid 402 thereby operating air valve 19' for opening the chuck which allows a raw stock to drop down into the machine. At the same time that the switch 401 is actuated, microswitch 403 is also actuated to energize solenoid 353 thereby operating air valve 21' to advance the turret or ram to the proper position. Simultaneously therewith, switch 403 is actuated which energizes solenoid 404, thereby stopping the tape motor. It must be understood that the solenoid switch 404 must either be a delayed action type or the tape motor must over travel so that one of the actuating holes 330 does not continue to dwell in registry with the control ports.

When the ram reaches its upper position, a limit switch 405 will again start the tape motor by energizing solenoid 400. Movement of the tape motor will then cause a further energizing of switch 403 which causes the double-throw, double-pole magnetic relay 353 to reverse and energize air valve 21" causing the turret or ram to retract. Simultaneously with causing the ram to retract, the microswitch 401 is again caused to energize switch 402, thereby reversing valve 19' and closing the chuck.

The tape motor continues to rotate with the tape to a position where microswitches 406 and 407 are caused to energize solenoids 352 or 408, depending upon the speed at which it is desired to run the work motor 17.

After the work motor 17 has started to rotate, the indexing tape progresses to a point where solenoid 409 is energized by means of microswitch 410, which causes indexing of the work tools on the turret and simultaneously therewith or shortly thereafter, solenoid 353 is energized by means of microswitch 403, thereby causing an advance of the ram and the particular operation designed for the tool contained in the turret.

Due to the fact that the solenoid switch 353 is a double-pole, double-throw switch, the ram can advance without any current flowing through the magnetic source of the switch 353. Therefore, after the impulse of current has been sent through the switch 353 by means of a microswitch 403 and an index in the tape causes switch 404 to stop the tape motor, the tape motor dwells in this position until the ram again reaches its upper limit and contacts switch 405 which again starts the tape motor by means of the switch 404.

This cycle, namely, indexing by means of the solenoid switch 409 and advance of the ram by means of switch 353, while the tape motor rests; starting the tape motor again when the ram reaches its upper limit; and continuing movement of the tape motor until the next tool has been properly indexed and the ram again started on its up-stroke, continues throughout the complete set of operations to form the part desired.

By the provision of a vertical, automatic turret lathe with most of the movable parts being mounted upon one or another of two vertical ground columns, a simple and efficient construction and operation can be maintained for a fully automatic machine tool. Space occupied by the machine tool extends vertically rather than horizontally where there is customarily excess space available. Complete automatic operation of the machine tool is made possible by the combination of air pressure control and electric control. Gravity is relied upon to some extent to assist in the operation of the machine and to minimize the use of power in performing the several functions. There has, therefore, been provided a turret lathe which satisfies a great many of the requirements of a quick-acting, high-production lathe.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. An automatic vertical turret lathe comprising a base, vertical supporting columns, a chuck on said columns disposed above said base adapted to hold the work, said chuck having an upwardly open loading aperture, a turret rotatably supported on one of said columns having a plurality of stations, said turret being movable axially relative to the column, an indexing mechanism for said turret mounted on the other of said columns beneath the turret adapted to rotate said turret to present said respective stations to the work, and a power device for advancing said turret upwardly against the work comprising a fluid actuated cylinder on the base having a piston therein extendable into contact with the turret and adapted to raise said turret to the work, and guide means cooperable with the turret at each successive station during the raising of said turret to the work.

2. An automatic vertical turret lathe comprising a base, vertical supporting columns, a chuck on said columns disposed above said base adapted to hold the work, said chuck having an upwardly open loading aperture, a turret rotatably mounted on one of said columns having a plurality of stations and having an edge thereof partially underlying said work, said turret being shiftable axially relative to the column, an indexing mechanism for said turret mounted on the other of said columns beneath the turret adapted to rotate said turret to present said respective stations to the work, and a power device for advancing said turret upwardly against the work comprising a fluid actuated cylinder in said base having a piston therein extendable into contact with the outer overlying portion of the turret and adapted to raise said turret to the work, and guide means on said other column cooperable with the turret at each successive station during the raising of said turret to the work.

3. In an automatic vertical turret lathe stationary members comprising a base and vertical supporting means, a work head on the supporting means, a turret carried by said base rotatable to a plurality of work positions, a power device on the base having a reciprocating element engaging the turret, an indexing device having one part on said turret and another part cooperable therewith on one of said stationary members, said one part comprising independent elements spaced circumferentially about the turret, said other part comprising a support attached to one of said stationary members, a reciprocating block mounted on the support, a reciprocating motor on the support adapted to reciprocate the block, a finger pivotally mounted on the block adapted to successively engage said independent elements on the turret, said finger extending substantially in the direction of movement of the block, and a lock element adapted to engage one of said independent elements and the finger in locking relationship, said lock element having movement out of engagement under impetus of an indexing movement of the finger upon advance of the block.

4. An automatic vertical turret lathe comprising a base, vertical supporting means including projections extending upwardly from the base located diametrically, and a vertical column supported in each projection, said columns having smooth surfaced cylindrical exteriors, a work head on the supporting means, a turret carried eccentrically on said support means rotatable to a plurality of work positions, a centerably disposed power cylinder and piston rod therefor in the base, said piston rod being operatively connected to said turret for moving the same into machining positions, and guide means for guiding movement of the turret at each successive work position, said guide means comprising an adjustable bracket on one column and a guide extension on the turret at each tool position having a vertically sliding interlock therewith during movement of the turret through a work cutting stroke and releasable therefrom in normal position of the turret.

5. An automatic vertical turret lathe comprising a base, vertical supporting means comprising projections extending upwardly from the base located on opposite sides of the center and a vertical column supported in each projection, a work head on the supporting means, a turret supported eccentrically on said base rotatable to a plurality of work positions, a centrally disposed power cylinder and piston rod therefor in the base, and guide means for guiding movement of the turret at each successive work position, said guide means comprising an adjustable bracket on one column and a guide extension on the turret at each tool position having a vertically sliding interlock with the bracket during movement of the turret through a work cutting stroke and releasable therefrom in normal position of the turret, said bracket having a track thereon and said guide extension comprising spaced rollers mounted eccentrically upon horizontal adjustable shafts and adapted to roll along opposite sides of the track.

6. An automatic vertical turret lathe comprising a base, vertical supporting means comprising projections extending upwardly from the base located on opposite sides of the center and a vertical column supported in each projection, a work head on the supporting means, a turret supported on one of said columns rotatable to a plurality of work positions, a centrally disposed power cylinder and piston rod therefor in the base, and guide means for guiding movement of the turret at each successive work position, said guide means comprising an adjustable bracket on the other of said columns and a guide extension on the turret at each tool position having a vertically sliding interlock with the bracket during movement of the turret through a work cutting stroke and releasable therefrom in normal position of the turret, said bracket having an elongated vertical passage therein and said guide extension comprising a vertically extending cylindrical stud adapted to slide into said passage.

7. An automatic vertical turret lathe comprising a base, a chuck supported at a location above the top of the base adapted to hold the work and a vertical column located upon the base providing support for the chuck, a horizontally revolvable turret on said column slidable vertically with respect thereto having a plurality of tool stations and power means beneath the turret adapted to engage the turret at each successive station and to advance said turret to the work, tool elements having positions respectively at said stations and adjustable gages on the tool elements engageable with the power means.

8. An automatic vertical turret lathe comprising a base, a chuck centrally disposed and supported at a location above the top of the base adapted to hold the work and a vertical column located eccentrically upon the base providing support for the chuck, a horizontally revolving turret on said column slidable vertically with respect thereto having a plurality of tool stations and power means beneath the turret adapted to engage the turret at each successive station and to advance said turret to the work, tools having positions respectively at said stations and including adjustable gages extending beneath each station comprising points of engagement with said power means, said gages being of variable length and adapted thereby to determine the extent of movement of the respective station toward the work.

9. An automatic vertical operating machine tool comprising a base, vertical supporting means, a work head on the supporting means, a turret rotatable to a plurality of work positions mounted eccentrically on said base, a centrally disposed power cylinder and piston rod therefor in the base, said piston rod being adapted to move upwardly against the turret for actuating said turret through a working stroke, and adjusting means for determining the limit of vertical turret movement comprising a downwardly depending projection at each tool position engageable with the piston rod of the power cylinder, said projection having a predetermined length proportionate to the required length of stroke of the power cylinder.

10. An automatic vertical turret lathe comprising a base, vertical supporting means, a work head on the supporting means, a turret rotatable to a plurality of work positions mounted eccentrically on said base, a centrally disposed power cylinder and piston rod therefor in the base, said piston rod being adapted to move upwardly against the turret for actuating said turret through a working stroke, and adjusting means for determining the limit of vertical turret movement comprising a downwardly depending projection at each tool position engageable with the piston rod of the power cylinder, said projection having upper and lower parts threadably engaged and adapted thereby to extend and retract the location of engagement of the adjusting means and the piston rod relative to the turret.

11. An automatic vertical turret lathe comprising a base, a vertical supporting means, a work head on the supporting means, a turret carried on said base movable to a plurality of work positions, speed adjusting elements on the turret at the work positions, and a centrally disposed power cylinder in the base, said cylinder comprising a hydraulic chamber and a piston device therein and a transverse dividing partition intermediate ends of the chamber, said piston device comprising an upper disc on one side of the partition and a lower disc on the other side thereof, said discs respectively forming upper and lower hydraulic chamber portions and a hydraulic fluid therein, a passage in the piston device communicating adjacent one end with the upper chamber portion and adjacent the other end with the lower chamber portion, and a valve member on the piston having an element thereof extending into the passage and normally spring urged to open position, said valve member being movable by the respective speed adjusting elements to a selected position of adjustment determining thereby the rate of flow of hydraulic fluid and speed of travel of the turret.

12. An automatic vertical turret lathe comprising a base, vertical supporting means, a work head on the supporting means, a turret carried eccentrically on said base rotatable to a plurality of work positions, an adjustable extension on the turret at the work positions, and a centrally disposed power cylinder in the base, said cylinder comprising a hydraulic chamber and a piston device therein and a transverse dividing partition intermediate ends of the chamber, said piston device comprising an upper disc on one side of the partition and a lower disc on the other side thereof, said discs respectively forming upper and lower hydraulic chamber portions of variable size and a hydraulic fluid therein, a piston rod having a bore therein communicating adjacent one end thereof with the upper chamber portion and adjacent the other end thereof with the lower chamber portion, an upper extension of said bore having communication with the top of the piston rod, and a valve device normally spring urged to open position having an element extending into the first bore, said valve element having engagement with the extension at each work position upon upward movement of the piston rod and adapted to move said valve element downwardly to a selected position of adjustment determining thereby the effective size of said first bore for controlling the rate of flow of hydraulic fluid between said chambers, said fluid being adapted to determine by its rate of flow the speed of movement of the piston device.

13. An automatic vertical turret lathe comprising a base, vertical supporting means, a work head on the supporting means, a turret carried eccentrically on said base rotatable to a plurality of work positions, a centrally disposed power cylinder and piston rod therefor on the base operable against the turret at a point remote from the center, said piston rod being adapted to move upwardly against the turret for actuating said turret through a working stroke, and a turret counterbalance operable between the base and the turret at the center of said turret.

14. An automatic vertical turret lathe comprising a base, vertical supporting means, a work head on the supporting means, a turret carried eccentrically on said base rotatable to a plurality of work positions, and a centrally disposed power cylinder and piston rod therefor in the base, said piston rod being adapted to move upwardly against the turret at a location remote from the center for actuating said turret through a working stroke, and a turret counterbalance operable to partially support the weight of the turret, said counterbalance comprising a chamber of variable size having one horizontal end wall coincident with the turret and another horizontal end wall coincident with a stationary portion of the lathe, and a compressed air line leading into said chamber.

15. An automatic vertical turret lathe comprising a base, vertical supporting means, a work head on the supporting means, a turret carried eccentrically on said base rotatable to a plurality of work positions, a centrally disposed power cylinder and piston rod therefor in the base, said piston rod being adapted to move upwardly against a portion of the turret remote from the center for actuating said turret through a working stroke, and a turret counterbalance operable to partially support the weight of the turret during the working stroke, said counterbalance comprising a set of telescoping cylinders concentrically disposed relative to the turret having one end of the set coincident with the turret and the other end coincident with the base, and a fluid pressure line communicating with the interior of said set of cylinders.

16. An automatic vertical turret lathe comprising a base, a pair of vertical supporting ground columns, a work head on the ground columns, a turret mounted on one of said ground columns rotatable to a plurality of work positions, a centrally disposed power cylinder and piston rod therefore in the base, said piston rod being adapted to move upwardly against a portion of the turret remote from the center for actuating said turret through a working stroke, and a turret counterbalance operable to partially support the weight of the turret during the working stroke, said counterbalance comprising a sleeve on the ground column on which the turret is mounted, a cylindrical wall in the turret around the sleeve forming a gas chamber surrounding and spaced from said ground column, upper and lower end plates sealing the ends of the chamber and having sliding friction contact with the sleeve, a partition wall in the chamber fixed to the sleeve having a sliding friction contact with the cylindrical wall, said partition being adapted to separate the chamber into upper and lower chamber portions, and a fluid line communicating with at least one of the chamber portions.

17. An automatic vertical turret lathe comprising a base, vertical supporting means, a work head on the supporting means, a turret rotatable to a plurality of work positions carried eccentrically on said base, a centrally disposed power cylinder and piston means therefor in the base, said piston means being adapted to move upwardly against the turret for actuating said turret through a working stroke, cut-off means on one vertical supporting means adjacent the work head, an indexing device having one part on said turret and another part cooperable therewith carried by the supporting means, guide means for guiding movement of the turret at each successive work position, and adjusting means for determining the limit of vertical turret movement and the speed of turret movement.

18. A machine tool comprising a base, a fluid actuated chuck vertically positioned above said base, a turret supported by said base and carrying a plurality of work tools, said turret being rotatable to successively position said work tools in working relation with said chuck and an expansible fluid-operated member adapted to support substantially all of the weight of said turret, a ram positioned vertically below said chuck and adapted to overcome the remainder of the weight of said turret to advance said turret into working position, said ram being actuated by an air cylinder and having means associated therewith to control the rate of upward movement of said ram, said means comprising a first and a second hydraulic chamber and a conduit communicating therebetween, pistons associated with said ram adapted to cause a flow of fluid from one chamber to the other upon movement of said ram, a valve in said conduit, and means associated with said tools adapted to restrict said valve when said ram contacts said tools.

19. A machine tool comprising a base, an air actuated chuck vertically positioned above said base, a vertically movable turret supported by said base and carrying a plurality of work tools, said turret being rotatable to successively position said work tools in working relation with said chuck and an expansible air-operated member adapted to support substantially all of the weight of said turret, a ram positioned vertically below said chuck and adapted to overcome the remainder of the weight of said turret to advance said turret into working position, said ram being actuated by an air cylinder and having means associated therewith to control the rate of upward movement of said ram, said means comprising a first and a second hydraulic chamber and a conduit communicating therebetween, pistons associated with said ram adapted to cause a flow of fluid from one chamber to the other upon movement of said ram, a valve in said conduit, and means associated with said tools adapted to restrict said valve when said ram contacts said tools.

20. In an automatic lathe having a base, a chuck disposed vertically above said base, a turret supported by said base adapted to carry a plurality of work tools and rotatable to advance each of said tools into working position with respect to said chuck and a ram disposed in said base and adapted to be extended vertically by means of air pressure, means for automatically controlling the sequence of operation, said means comprising a solenoid operated by air valves associated with each of the operations of said machine, a plurality of magnetic relays adapted to control said air valves, a microswitch adapted to energize each of said magnetic relays and means for sequentially closing said microswitches, said means comprising a piston block having a piston therein associated with each of said microswitches, a flexible tape formed with a plurality of holes therethrough adapted to act as valves to apply compressed air to each of said pistons.

21. In an automatic lathe having a base, a chuck disposed vertically above said base, a turret supported by said base adapted to carry a plurality of work tools and rotatable to advance each of said tools into working position with respect to said chuck and a ram disposed in said base and adapted to be extended vertically by means of air pressure, means for automatically controlling the sequence of operation, said means comprising a solenoid operated by air valves associated with each of the operations of said machine, a plurality of magnetic relays adapted to control said air valves, a microswitch adapted to energize each of said magnetic relays and means for sequentially closing said microswitches, said means comprising a piston block having a piston therein associated with each of said microswitches, a flexible tape traveling at a constant speed and formed with a plurality of holes therethrough adapted to act as valves to apply compressed air to each of said pistons.

22. An automatic vertical turret lathe comprising a base, vertical supporting columns, a chuck on said columns disposed above said base adapted to hold the work, said chuck having an upwardly open loading aperture, a turret rotatably supported on one of said columns having a plurality of stations, said turret being movable axially relative to the column, an indexing mechanism for said turret to rotate said turret to present said respective stations to the work, and a power device for advancing said turret upwardly against the work comprising a fluid actuated cylinder on the base having a piston therein extendable into contact with the turret and adapted to raise said turret to the work, and guide means cooperable with the turret at each successive station during the raising of said turret to the work.

23. An automatic vertical turret lathe comprising a base, vertical supporting columns, a chuck on said columns disposed above said base adapted to hold the work, said chuck having an upwardly open loading aperture, a turret rotatably mounted on one of said columns having a plurality of stations and having an edge thereof partially underlying said work, said turret being shiftable axially relative to the column, an indexing mechanism for said turret to rotate said turret to present said respective stations to the work, and a power device for advancing said turret upwardly against the work comprising a fluid actuated cylinder in said base having a piston therein extendable into contact with the outer overlying portion of the turret and adapted to raise said turret to the work, and guide means on said other column cooperable with the turret at each successive station during the raising of said turret to the work.

24. An automatic vertical turret lathe comprising a base, a chuck supported at a location above the top of the base adapted to hold the work and a vertical column located upon the base providing support for the chuck, a horizontally revolvable turret on said column slidable vertically with respect thereto having a plurality of tool stations, and power means beneath the turret adapted to engage the turret at each successive station and to advance said turret to the work.

ROBERT B. WALDER.

References Cited in the file of this patent

UNITED STATES PATENTS

| Number | Name | Date |
|---|---|---|
| 714,841 | Wells | Dec. 2, 1902 |
| 2,071,786 | Ferris et al. | Feb. 23, 1937 |
| 2,116,376 | Anderson | May 3, 1938 |
| 2,389,019 | Bazley et al. | Nov. 13, 1945 |
| 2,401,072 | Himoff | May 28, 1946 |
| 2,408,658 | Kurzweil | Oct. 1, 1946 |
| 2,464,975 | Gibbs et al. | Mar. 22, 1949 |

FOREIGN PATENTS

| Number | Country | Date |
|---|---|---|
| 113,355 | Australia | July 10, 1941 |
| 125,892 | Great Britain | May 1, 1919 |